United States Patent [19]

Castoldi

[11] Patent Number: 4,580,395
[45] Date of Patent: Apr. 8, 1986

[54] FODDER CONDITIONER

[75] Inventor: Luigi Castoldi, Abbiategrasso, Italy

[73] Assignee: BCS S.p.A., Milan, Italy

[21] Appl. No.: 652,675

[22] Filed: Sep. 19, 1984

Related U.S. Application Data

[63] Continuation-in-part of Ser. No. 524,040, Aug. 17, 1983, abandoned.

[30] Foreign Application Priority Data

Jun. 1, 1983 [IT] Italy .................... 21404 A/83

[51] Int. Cl.⁴ .................................................. A01D 82/00
[52] U.S. Cl. .............................. 56/16.4; 56/DIG. 1;
100/170; 29/113 R; 29/123; 29/124
[58] Field of Search ................. 56/DIG. 1, 16.4, 192;
100/169, 170; 29/113 R, 113 AD, 123, 124, 128

[56] References Cited

U.S. PATENT DOCUMENTS

| | | | |
|---|---|---|---|
| 2,958,742 | 11/1960 | Palmer | 29/123 |
| 3,470,948 | 10/1969 | Korsch | 29/113 AD |
| 3,656,284 | 4/1972 | Meek et al. | 56/DIG. 1 |
| 4,315,346 | 2/1982 | Demuth | 29/113 R |

FOREIGN PATENT DOCUMENTS

| | | | |
|---|---|---|---|
| 1938935 | 2/1971 | Fed. Rep. of Germany | 29/113 R |
| 6716264 | 5/1968 | Netherlands | 29/113 AD |
| 388699 | 6/1965 | Switzerland | 29/113 AD |
| 683673 | 9/1979 | U.S.S.R. | 56/DIG. 1 |

Primary Examiner—Gene Mancene
Assistant Examiner—John G. Weiss
Attorney, Agent, or Firm—Wenderoth, Lind & Ponack

[57] ABSTRACT

A fodder conditioner, also known as a fodder squeezer, includes at least two horizontal rotating rollers, kinematic and constructional devices for securing the rollers in a mutual substantially parallel relationship, spaced apart at preset positions with respect to each other and to the ground, and a motor kinetically coupled to the rollers. At least one of the rollers is formed from an elastomeric material such as rubber, is of hollow construction, and is secured, mechanically and in an airtight manner, to a shaft extending coaxially with the rotation axis of the rollers, with the two ends of the shaft protruding out of the roller ends.

3 Claims, 6 Drawing Figures

FODDER CONDITIONER

CROSS-REFERENCE TO RELATED APPLICATION

This application is a continuation-in-part of Ser. No. 524,040, filed Aug. 17, 1983 abandoned.

BACKGROUND OF THE INVENTION

1. Field of the Invention

This invention relates to a fodder conditioner, also called a "fodder squeezer".

2. Description of the Prior Art

Known are agricultural implements called fodder conditioners or fodder squeezers, which are intended to make the drying rates of the various parts encompassed by the term "fodder" more uniform, and specifically to accelerate the drying process of the largest parts thereof (mainly made up of stems) with respect to the smallest parts (mainly made up of leaves). In this manner, the overall drying time of fodder can be shortened. This cutting down of drying time can be of the order of up to 30-50 percent, that is of such a magnitude as to materially affect the processing cost.

Further, concurrent drying of stems and leaves prevents the latter, which dry up more quickly, from separating from the former and becoming a loss so as to deprive the fodder of its nutritional and organoleptic properties.

To achieve such results, the state-of-the-art provides conditioning, or squeezing, devices which comprise essentially a pair of squeezing rollers or cylinders, in the nip of which freshly mowed fodder is fed. The thusly conditioned fodder is then spread again over the ground to complete its drying. The pair of squeezing rollers provided by the state of the art are essentially of three different types, namely:

(1) smooth, mostly steel, rollers, at least one of which may be coated with a resilient material (rubber) and/or formed with surface grooves or ribs to improve its hold on fodder. The bearings of at least one of the two squeezer rollers are mounted in adjustable elastic supports to enable changing both the axis spacing and pressure exerted between the two rollers by the springs of the elastic supports, so as to adjust said pressure for the characteristics of the fodder to be conditioned and to cope with the presence therein of such hard foreign matter (branches, stones, dirt) as may forcibly widen the spacing of the rollers.

(2) toothed rollers, meshing together like a gear pair, through the nip whereof fodder is caused to pass for processing.

(3) a smooth, mostly rubber-coated, steel roller and a toothed roller, also of steel, with characteristics complementary to the former.

The above-cited advantages of prior fodder conditioning processes are accompanied by some problems, which the three types of conventional conditioners just described can only partly obviate.

In fact, a really effective squeezing action on fodder stems is only applied by the first-mentioned conditioner type having smooth rollers, whereas the one of the second-mentioned type can do no better than bend the stems. On the other hand, the conditioner of the first-mentioned type requires that both rollers be driven directly and since one of them must include movable supports for spacing adjustment purposes, as mentioned above, its drive system is made more complicated. It is common practice to use a belt drive with a tightener, either of the chain or gear type, which is accompanied by well-known drawbacks brought about by wear, the need to apply constant adjustment and maintenance, inertia of parts undergoing sharp displacement movements (movable support roller and tightener) upon the appearance of branches or stones between the rollers, or the need to merely adjust the roller spacing to accommodate changes in the flow rate of the fodder picked up from the ground.

This increased complication of a mechanical nature is accompanied by an increase in the mechanical stresses, which make necessary the adoption of drive protecting devices such as a coupling or safety pin to prevent damage and breakage. Such protective measures can only partly solve the problem, because in the event of a corrective action, they would add to the downtime of the production process for their replacement. Furthermore, the transmission of motion to a rotary element with movable supports is known to imply a decreased drive efficiency and hence a higher energy consumption.

With the conventional conditioner, direct motion transmission can be limited to the fixed support roller alone, but the suitability of this approach is offset by the reduced efficiency of the squeezing action. Further, the likelihood of jamming and breakage from foreign matter is not eliminated.

The third type of prior conditioner is a compromise of the former two and requires driving both rollers similarly to the first type.

A further drawback shared by the three prior types of conditioners is that the arrangement for adjusting the pressure between the rollers does not remove non-uniformity between the pressure applied on the middle, thicker portion of the fodder layer between the rollers, and the pressure on the side portions, of smaller thickness. This results in incomplete conditioning of the side portions, or excessive squeezing of the moddle portions.

SUMMARY AND OBJECTS OF THE INVENTION

It is a primary object of this invention to obviate the drawbacks of fodder conditioners of the state-of-the-art type by providing a novel fodder conditioner, wherein the roller pressure applied in the presence of foreign matter to fodder can be adjusted automatically in the course of processing without requiring a change of the roller spacing.

Another object of the invention is to provide a fodder conditioner which enables adjustment of the squeezing pressure exerted on the fodder to accommodate different fodder varieties, without requiring a change of the roller spacing.

It is a further object of this invention to provide a fodder conditioner which requires no limiting or protecting elements against straining of the roller drive members.

Still another object of the invention is to provide a fodder conditioner, wherein the squeezing pressure applied to the fodder is uniform over the entire length of the generatrix of the roller active surfaces, irrespective of changes in the thickness of the fodder layer between the rollers along the generatrix.

Another object of the invention is that of improving the mechanical efficiency of the rotary drive to the rollers of a fodder conditioner, and lowering wear and maintenance requirements of all its mechanical members.

These and other objects are achieved by the fodder conditioner of this invention, which comprises at least two rotating horizontal cylindrical bodies extending along a substantially axial direction, kinematic and structural means for securing in a substantially parallel position to each other and with respect to the ground the rotation axes of the cylindrical bodies, a source of mechanical power, characterized in that at least one of the cylindrical bodies comprises a hollow gas-tight tube of an elastomeric material and elastic reaction means to withstand the radial strain imposed by the fodder on the gas-tight tube.

Advantageously, valving bodies are provided between the exterior and interior of the substantially hollow gas-tight tube of elastomeric material to change, through a means known per se, pressure inside thereof.

Expediently, the rotation shaft of the substantially hollow gas-tight tube of elastomeric material is bored in a mainly longitudinal direction, said bore communicating the exterior of the hollow gas-tight tube to the interior thereof, and the valving body being mounted at the outward end of the bore.

Also, expediently, the interior of the substantially hollow gas-tight tube of elastomeric material may be filled with an open cell elastic material.

BRIEF DESCRIPTION OF THE DRAWINGS

Further features and advantages of the invention will be more clearly apparent from the following description of a preferred, though not exclusive, embodiment of this fodder conditioner, as illustrated by way of example in the accompanying drawings, where.

DETAILED DESCRIPTION OF THE PREFERRED EMBODIMENTS

Figure 1:
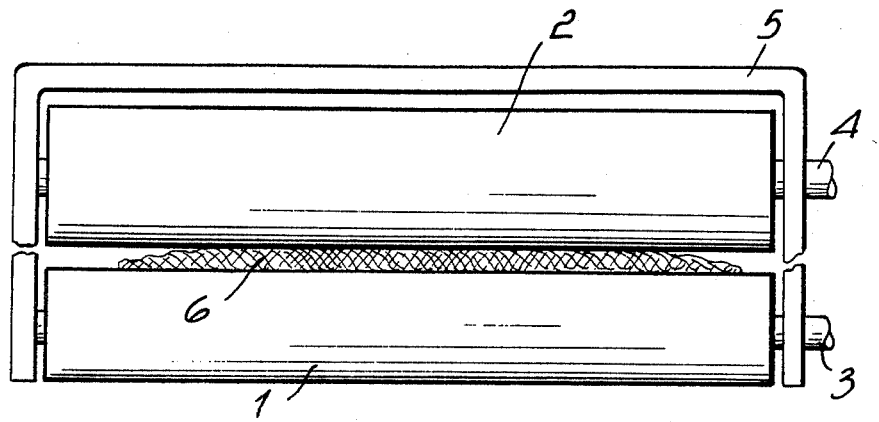
FIG. 1 is a schematic front view showing some main elements of a conventional fodder conditioner, with the roller bearings and means of elastic suspension coupled to the bearings of one roller omitted for simplicity of illustration.

Making reference now to FIG. 1, there are schematically illustrated the main elements of a conventional fodder conditioner of the first type with smooth steel rollers. The conditioner comprises two squeezing rollers 1, 2 and respective shafts 3, 4, mounted in a frame 5, a fodder layer 6 being shown in cross-section. For simplicity of illustration, the bearings of the shafts 3, 4 have been omitted from the view, as have the elastic support and adjustment means incorporated in one of the two rollers shown in accordance with conventional practice, and the kinematic elements of the roller drive.

Figure 2:
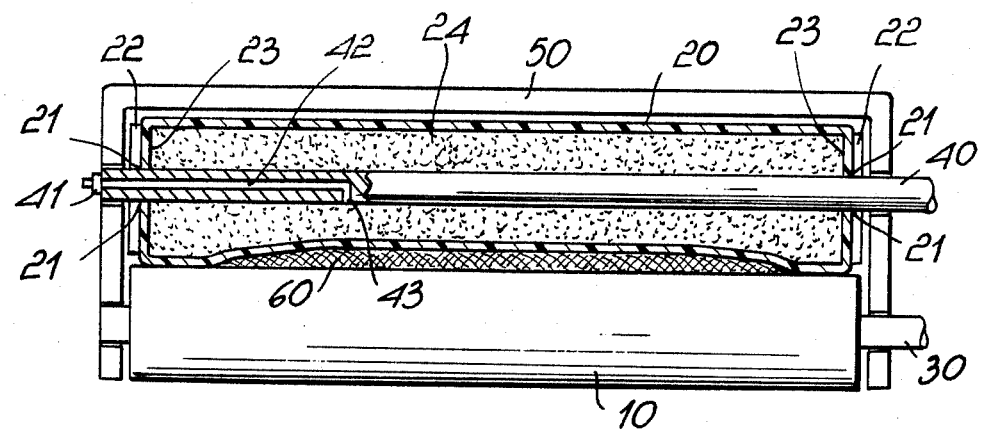
FIG. 2 is a schematic front view showing, partly in section, some main elements of a fodder conditioner according to the invention, kinematic means for transmitting rotary motion to the cylindrical bodies and the bearings of the two rollers having been omitted for clarity.

FIG. 2 shows the main elements of the fodder conditioner according to this invention, which comprises: two cylindrical bodies 10, 20 extending in a substantially axial direction, one of which is expediently in the form of a steel roller 10, and the other of a substantially hollow construction elastomeric (rubber) roller 20, shown in longitudinal section and being secured mechanically in a liquid tight manner to the shaft opening 21 through conventional means. Such means may comprise, for example, the metal flanges 22 welded or otherwise fitted onto the shaft 40 to the bases 23 to the hollow elastomeric cylindrical body or hollow construction roller 20. The connection between flange 22 and base 23 may be effected with any suitable mechanical fastening and sealing means and/or adhesive.

The shaft 40 is bored in a mainly longitudinal direction, said bore having of preference a coaxial portion 42 and a radial portion 43. Mounted on the outward end of the shaft 40 is the valving element 41, including a shut-off valve.

The interior of the cylindrical body 20 is filled with an open cell material 24 such as foam rubber or polyurethane.

The fodder 60 being conditioned is shown in section. For simplicity of illustration, the bearings of the shafts 30 and 40 (which are assumed incorporated to the frame 50) and kinematic means of transmitting the rotary motion, which may comprise a gear pair in mutual meshing engagement and keyed to the shafts 30 and 40, have been omitted from view. The motion is assumed to be transmitted directly to one shaft from the mechanical power source (e.g. a gasoline engine, not shown) through any suitable drive member.

The operation of the invention will be next described with reference to FIG. 2.

Fodder 60 to be conditioned is lifted from the ground directly after mowing through known means and caused to pass between the two rollers 10, 20 which will squeeze its largest single parts (stems). The material is then discharged again onto the ground and allowed to dry completely. Contrary to the state-of-the-art practice, with the inventive conditioner, the elastic reaction which effects the squeezing of the fodder 60 is not due to springs attached to the supports of one of the rollers, but rather to compression of the fluid (e.g. air) contained within the sealed hollow roller 20.

Figure 3:
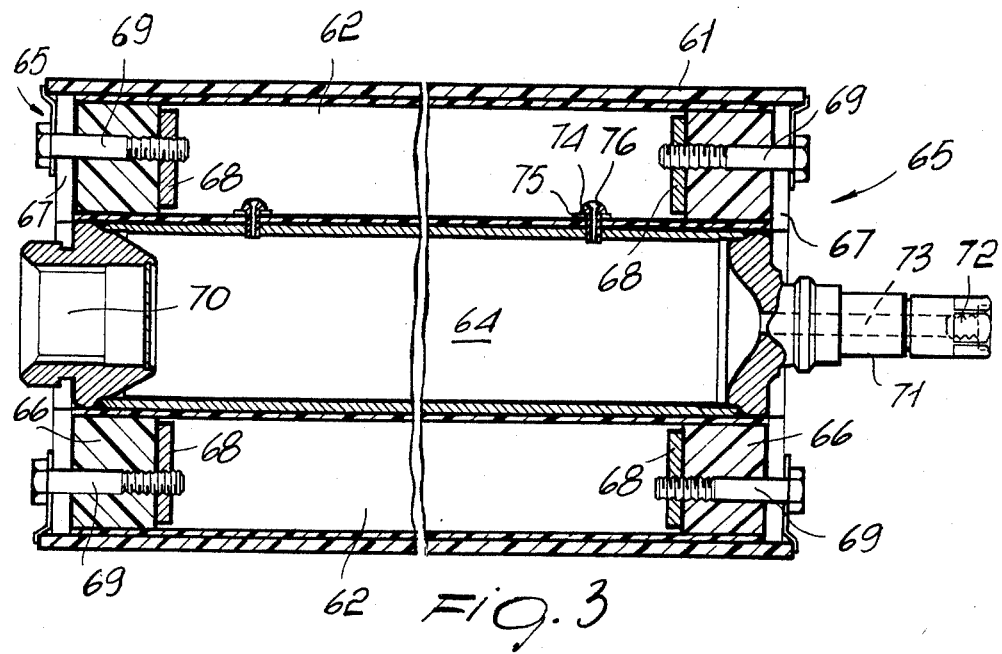
FIG. 3 is a partly sectional side view of the elastomeric cylindrical body according to a second embodiment of the invention.
Figure 4:
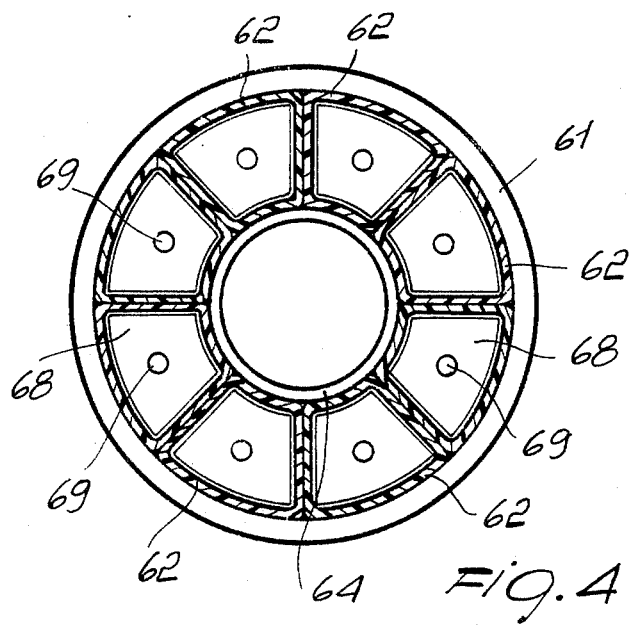
FIG. 4 is a cross-section through the cylindrical body of FIG. 3.

FIGS. 3 and 4 depict a second embodiment of the cylindrical body of the invention: tubular means are provided which comprise, for example, the tube 61 of an elastomeric material and elastic reaction means to withstand the radial strain imposed by the fodder on the tube 61. Such elastic reaction means comprise, for example, air chambers 62. The air chambers 62 are arranged longitudinally to the shaft 64.

The cylindrical body comprises two flanges 65 which are located at the opposite ends of the tube 61.

Each of the two flanges comprises eight cylinder segments 66 located at the eight inner air chambers 62. Each cylinder segment 66 is formed from an elastically deformable elastomeric material and is sandwiched between two plate-like bodies comprising the plates 67 and 68. The bolt 69, laid parallel to the shaft 64, tightens the plates 67 and 68 against the cylinder segment 66 which is deformed thereby in the radial direction.

The expansion in the radial direction of the cylinder segment 66 causes one end of the inner air chambers 62 to be closed air-tight.

The ends 70 and 71 of the shaft 64 are provided with seats for the transmission of the mechanical power and for bearings, not shown for clarity.

Valving means 72 are provided to vary the pressure within the cylindrical body by the injection of a pressurized gas. The gas flows, through the valve 72 and conduit 73, into the shaft 64.

The screws 74 allow the gas to pass from the shaft 64 to the inner air chamber 62. The screws 74 each have a hole 76 going therethrough and a washer 75 to prevent the entry of the gas in between inner air chambers 62.

Figure 5:
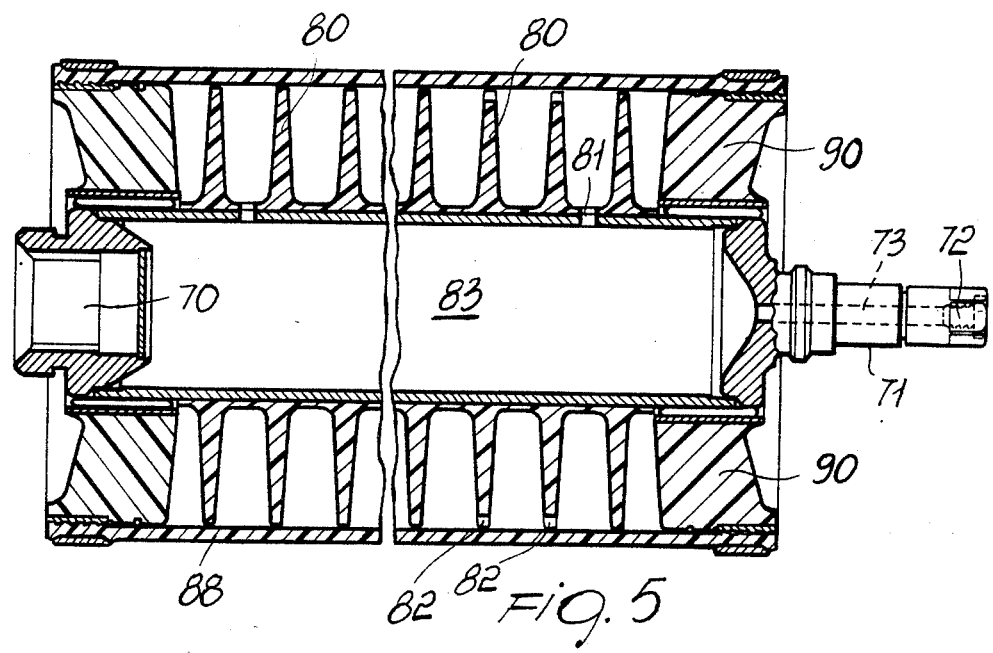
FIG. 5 is a partly sectional side view of the elastomeric cylindrical body according to a third embodiment of the invention.

FIG. 5 shows a third embodiment. Elastic reaction means are provided in a tube 88 with a plurality of diaphragms 80 formed from an elastomeric material.

The diaphragms 80 may have, alternatively, a wave-like profile, while retaining their ability to withstand and counteract a thrust in the radial direction.

The openings 81 and 82 allow the pressurized gas to flow between the diaphragms 80.

The diaphragms 80 are welded directly to the shaft 83 with known rubber-metal welding methods.

Figure 6:
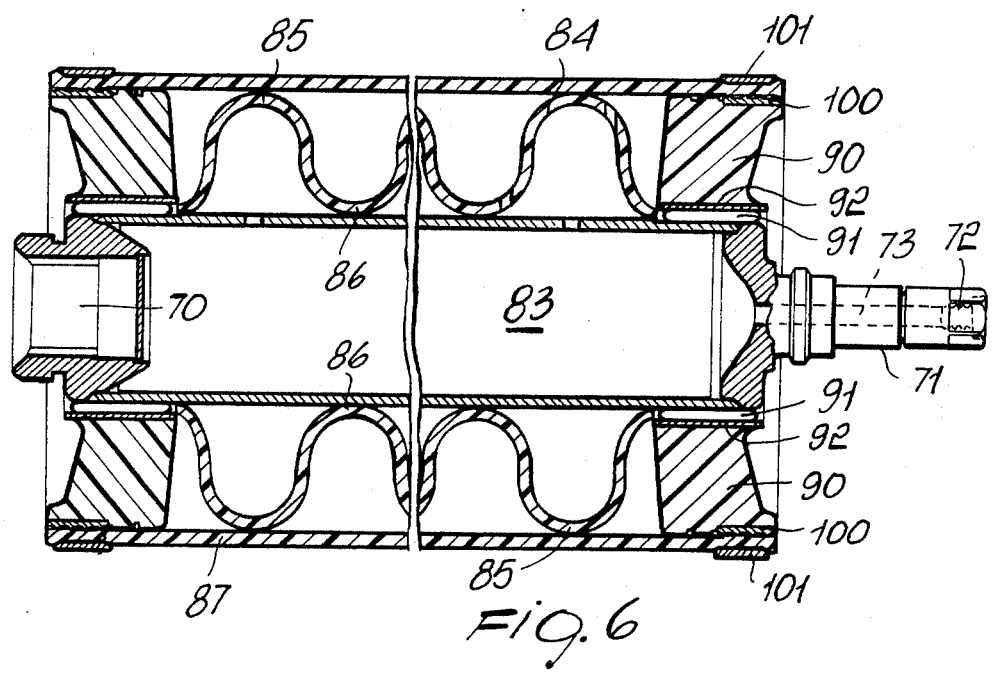
FIG. 6 is a partly sectional side view of the elastomeric cylindrical body according to a fourth embodiment of the invention.

FIG. 6 shows a fourth embodiment. Elastic reaction means are provided which comprise an elastomeric cylinder having a wave-like surface. The outer ends 85 of the wave formations engage with the tube 87, and the inner ends 84 engage with the shaft 83.

With reference to FIGS. 5 and 6, two closure flanges are provided for the tubes 87 and 88. Each flange comprises a cylindrical portion 90 formed from an elastomeric material and being bored axially to let the shaft 83 through the bore.

The cylindrical portion 90 has first tightening means for a tight closure around the shaft 83. Such first tightening means comprise a cylindrical gasket 91 of an elastomeric material and a first ring 92 of a metal material, engaging the gasket 91 on the inside thereof and being welded to the outside of the cylindrical portion 90. The cylindrical portion 90 has second tightening means for a tight closure around the tubes 87, 88. Such second tightening means comprise a second ring 100 having a serration on the outside and being welded with its inside to the cylindrical portion 90.

A third ring 101 cooperates with the second ring 100 in engaging the tubes 87, 88 internally and externally.

The elastic reaction means described enable the eccentric rotation of the tubes 20, 61, 87, 88 to be prevented, thus preventing wear of the tubes and flanges, and also affording optimum control on the pressure to be applied to the fodder 60 to be conditioned.

This arrangement of the present invention has at least three important consequences.

The first consequence is that, differently from state-of-the-art practice, an undesired and sudden introduction in the nip between the rollers of foreign matter (branches, stones) picked up along with the fodder causes no sharp raising of the whole mass of the elastically suspended roller, but rather a mere transient deformation and local raising of a small portion of the rubber cylinder, having minimal mass and inertia. Furthermore, the elastic reaction opposing this local deformation of the rubber roller wall is also reduced, resulting from the small pressure increase produced inside the roller by the local deformation. It follows that both the elastic reaction and the inertial reaction in the presence of a foreign object appearing in the nip between the rollers are much less with the inventive conditioner than with prior conditioners, and just as reduced are the stresses on the drive members.

This arrangement not only allows a simplification of the problem of transmitting the motion to the movable support roller of conventional design, but also permits the elimination of couplings or safety pins from the drive elements, or at least a marked decrease in the servicing intervals and downtime for their replacement.

A second important consequence of the operating mode of this invention is the following.

The thickness of the fodder layer 60 being processed is unavoidably non-uniform and tends to be higher at the middle of the roller and lower at the edges, as shown in FIG. 2. With the conventional conditioner (FIG. 1) this greater thickness of the material at the middle reflects itself in the roller (such as the roller 2 in FIG. 1) being bodily raised in its movable supports. Consequently, the material at the edges is not conditioned, while that at the middle undergoes a more powerful squeezing action than desired. With the inventive conditioner, on the contrary, separation of the rubber roller from the steel roller 10 adjusts itself to the material thickness at all points, and the squeezing pressure remains the same all along the roller generatrix. This same automatic adjustment of the gap between the rollers will occur each time that the flow rate of grass picked up from the ground varies. Thus, a more uniform conditioning effect is achieved.

A third important consequence of the inventive mode of operation is the possibility of adjusting the conditioning pressure to the fodder type being processed by changing the internal pressure of the roller by means of the valve through an axial bore and a radial bore of the shaft, without the roller spacing having to be changed. In actual practice, the useful pressure range will be of 0 to 5 relative atmospheres, the lower limit corresponding to delicate fodder varieties and the upper limit to tougher fodder.

It has been found in actual practice that, especially at high rotational speeds, the hollow rubber roller tends to turn eccentrically. This may be prevented by filling the roller cavity, e.g. with an open cell foam material 24 such as rubber or polyurethane, which would bring about a stabilizing effect without hindering the pneumatic reaction.

It has also been found useful to incorporate into the rubber of the roller, a reinforcement in the form of one or more plies of a textile material (not shown).

The invention as described hereinabove is susceptible of many modifications and variations without departing from the scope of the instant inventive concept. Thus, as an example, the roller may comprise a plurality of pneumatic tires laid side-by-side, where each tire would be fed air through a radial hole connected to the longitudinal bore. In a further modification, the cell material may be replaced with an air chamber, like chamber 67 in FIGS. 3 and 4, wound helically around the shaft. According to the latter modification, the cylinder has no air-tight means but serves the function of a tire, air-tightness being provided by the inner tube wound helically around the shaft until the whole inside space of the cylinder has been filled. According to another modification, the roller may be coated with rubber or be of solid rubber construction, or may be also a hollow elastomeric roller according to the invention. The surface of the steel roller and/or the hollow rubber roller may be either scored, or indented, or dimpled, etc. The rollers may be arranged side-by-side in a vertical direction instead of horizontal. The conditioner of this invention may be connected or incorporated into a mower, either towed behind or carried on a tractor, in which case the roller drive motion may be derived from the tractor. The number of coupled rollers may be higher than two, the roller direction of rotation being assumed to be such that the adjacent surfaces of contiguous rollers have equidirectional linear velocities.

The foregoing preferred embodiments are considered illustrative only. Numerous other modifications will readily occur to those skilled in the pertinent technology. Consequently, the disclosed invention is not limited to the exact construction and process shown and described hereinabove but is defined by the claims appended hereto.

1. Fodder conditioner comprising:
   at least two rotating horizontal cylindrical bodies for squeezing the fodder therebetween, each having central shafts extending along a substantially axial direction,
   kinematic means for securing in a substantially parallel position with respect to each other the rotation axes of the cylindrical bodies,
   wherein at least one of the cylindrical bodies includes a gas-tight tube made of an elastomeric material,
   an elastic reaction means for withstanding the radial strain induced by fodder passing between the gas-tight tube and the other of the cylindrical bodies,
   said gas-tight tube has at least two flanges arranged at the ends thereof,
   each of the at leas two flanges has an axially bored cylindrical portion formed at least partially from an elastomeric material,
   each of said cylindrical portions has first tightening means for gas-tight closure around the central shaft of the gas-tight tube and second tightening means for gas-tight closure around the interior of said gas-tight tube,
   said elastic reaction means includes a cylinder of an elastomeric material having a wave-like surface extending longitudinally along the central shaft,
   outward ends of said wave-like surface engage with an inside surface of said gas-tight tube, and
   inward ends of said wave-like surface engage with the central shaft of the gas-tight tube.

2. Fodder conditioner according to claim 1, characterized in that:
   said second tightening means includes a second ring formed with a serration on the outside thereof and being welded on the inside thereof to said cylindrical portion, and also includes a third ring,
   said second and third rings together engaging the gas-tight tube internally and externally, respectively.

3. Fodder conditioner according to claim 1, wherein:
   said first tightening means includes a cylindrical gasket of an elastomeric material and a first ring engaged with said cylindrical gasket and welded to said cylindrical portion.

* * * * *